US011802035B2

(12) United States Patent
Landler (10) Patent No.: US 11,802,035 B2
(45) Date of Patent: Oct. 31, 2023

(54) CLAMPING DEVICE FOR HOLDING A CONTAINER (71) Applicant: KRONES AG, Neutraubling (DE)

(72) Inventor: Bruno Landler, Neutraubling (DE)

(73) Assignee: KRONES AG, Neutraubling (DE)

( * ) Notice: Subject to any disclaimer, the term of this patent is extended or adjusted under 35 U.S.C. 154(b) by 425 days.

(21) Appl. No.: 16/953,624

(22) Filed: Nov. 20, 2020

(65) Prior Publication Data
US 2021/0154863 A1 May 27, 2021

(30) Foreign Application Priority Data

Nov. 22, 2019 (DE) ...................... 10 2019 131 587.5

(51) Int. Cl.
*B67C 3/24* (2006.01)
*B65G 47/90* (2006.01)
*B65G 47/86* (2006.01)
*B25J 15/02* (2006.01)

(52) U.S. Cl.
CPC ............ *B67C 3/242* (2013.01); *B65G 47/847* (2013.01); *B65G 47/90* (2013.01); *B25J 15/0226* (2013.01); *B65G 2201/0235* (2013.01)

(58) Field of Classification Search
CPC ...... B67C 3/242; B65G 47/847; B65G 47/90; B65G 2201/0235; B25J 15/0226
See application file for complete search history.

(56) References Cited

U.S. PATENT DOCUMENTS

| 5,893,700 | A | 4/1999 | Kronseder | |
|---|---|---|---|---|
| 8,672,376 | B1 | 3/2014 | Wilson et al. | |
| 8,833,824 | B2* | 9/2014 | Fahldieck | B65G 47/847 198/470.1 |
| 8,894,114 | B2* | 11/2014 | Fahldieck | B67C 3/242 294/90 |
| 9,415,951 | B2* | 8/2016 | Fahldieck | B08B 9/426 |
| 10,865,055 | B2* | 12/2020 | Schulnig | B67C 3/242 |

(Continued)

FOREIGN PATENT DOCUMENTS

| CN | 104002310 A | 8/2014 |
|---|---|---|
| CN | 104003185 A | 8/2014 |

(Continued)

OTHER PUBLICATIONS

German Office Action dated Sep. 9, 2020 for German Application No. DE 10 2019 131 587.5, 24 pages.

(Continued)

*Primary Examiner* — Stephen A Vu
(74) *Attorney, Agent, or Firm* — Haynes and Boone, LLP (57) ABSTRACT A clamping device for holding a container in a container handling device, for example for holding a beverage container by a neck portion, includes a first clamping arm arranged on a support plate pivotably about a first pivot shaft and having a holding portion for contact against the container to be held, and a second clamping arm arranged on the support plate pivotably about a second pivot shaft and having a holding portion for contact against the container to be held. The first pivot shaft and the second pivot shaft respectively have a cylinder pin portion for forming a form closure, radially to the longitudinal direction of the pivot shaft, with a bore in a support of a container handling device.

19 Claims, 6 Drawing Sheets (56) References Cited

U.S. PATENT DOCUMENTS

| | | | |
|---|---|---|---|
| 2011/0114454 A1 | 5/2011 | Blazarin et al. | |
| 2012/0086229 A1* | 4/2012 | Bodtlander | B67C 3/242 |
| | | | 294/198 |
| 2014/0175819 A1 | 6/2014 | Wilson et al. | |

FOREIGN PATENT DOCUMENTS

| | | |
|---|---|---|
| DE | 20 2006 018 379 U1 | 2/2008 |
| DE | 10 2012 218 204 A1 | 4/2014 |
| DE | 102017108926 A1 | 10/2018 |
| EP | 2159172 A1 | 3/2010 |
| WO | WO 03/078285 A1 | 9/2003 |
| WO | WO 2018/130266 A1 | 7/2018 |

OTHER PUBLICATIONS

Extended European Search Report dated Apr. 16, 2021, European Patent Application 20209312.6, 8 pages.
Office Action dated Mar. 3, 2022 in corresponding Chinese application No. 202011295260.8, 9 pages.

* cited by examiner

CLAMPING DEVICE FOR HOLDING A CONTAINER

CROSS REFERENCE TO RELATED APPLICATIONS

This application claims priority from German Patent Application No. DE 10 2019 131 587.5, filed on Nov. 22, 2019 in the German Patent and Trademark Office, the disclosure of which is incorporated herein by reference in its entirety.

BACKGROUND

Technical Field

The present invention relates to a clamping device for holding a container in a container handling device, for instance for holding a beverage container by a neck portion.

Related Art

It is known in beverage bottling plants to transport the containers which are respectively to be filled, or containers which have already been filled, through the individual handling stations of the container handling device by means of clamping devices. In this context, different clamping devices, which in different ways hold the respective containers to be treated, are known.

Thus, clamping devices, for instance, which merely through the insertion of the respective container into the clamping device are elastically pretensioned and then hold the container, are known. From DE 10 2012 218 204 A1, such a clamp for the gripping of containers is known. The clamp here has a fixed position. For the gripping of a container, this must be pushed into the clamp. The rigid gripping arms are hereupon spread outwards, so that the container must be moved against the closing force of the gripping arms that is generated by the spreading of the clamp. As a result, the container, when being inserted, is subjected to a high force, so that such holding devices are not suitable for gripping or holding fragile and/or easily deformable, as well as thin-walled, containers. At least a tendency to scratch the surfaces of the respective containers is given, so that the quality of the containers is lowered.

Also known are active clamping devices in which an opening and closing of the respective holding portions of the clamping device is actively performed by means of an actuator. Active clamping devices of this kind serve in particular to enable a secure and gentle take-up of the respective containers from a preceding clamping device or to ensure an equally secure and container-friendly transfer of the containers to a following clamping device. In particular, through the active opening and closing of the respective clamping device, an increased friction on the respective container, which could lead, for instance, to a scratching of the container, can be avoided and, on the other hand, a predefined holding force or clamping force, which can be maintained within a predefined tolerance range of the container dimension, can be set. Active clamping devices of this kind are composed of a multiplicity of single parts, for instance clamping arms, bushings, spring elements, pretensioning elements, and appropriate connecting elements for securely connecting the aforementioned parts. Clamping devices which are constructed in this way hence have to be laboriously cleaned and have a correspondingly high production complexity.

Depending on the field of application, known clamping devices are fitted on or from underneath to a star-type clamp support with a plurality of screws, mostly four to five screws. Generally, two screws with bolt portion for fastening the clamping arms of the clamping device to the support, and at least two further screws for fastening a support plate of the clamping device to the clamp support, are used. Both an initial assembly and an exchange of a clamp during overhaul or in the event of a fault require a high expenditure of time in order to release these several screws per clamping device. Moreover, after the release of the screws, a plurality of loose single parts exists, which makes both the initial assembly and a maintenance or an exchange more difficult.

SUMMARY

The present disclosure describes an improved clamping device for holding a container in a container handling device, for example, for holding a beverage container by a neck portion according to various embodiments.

A clamping device for holding a container in a container handling device, for example, for holding a beverage container by a neck portion, is described, including a first clamping arm, arranged on a support plate pivotably about a first pivot shaft and having a holding portion for contact against the container to be held, and a second clamping arm, arranged on the support plate pivotably about a second pivot shaft and having a holding portion for contact against the container to be held. The first pivot shaft and the second pivot shaft respectively have a cylinder pin portion for forming a form closure, radially to the longitudinal direction of the pivot shaft, with a bore in a support of a container handling device.

Because the first pivot shaft and the second pivot shaft respectively have a cylinder pin portion for forming a form closure, radially to the longitudinal direction of the pivot shaft, with a bore in a support of a container handling device, the pivot shafts can be introduced with their cylinder pin portions directly into the correspondingly configured bores of the support of the container handling device, without the need to screw together the pivot shafts. In other words, the assembly of the pivot shafts can be realized without these having to have a thread with which they can be engaged in a correspondingly configured thread in the support. Rather, the pivot shafts can be easily introduced into the bores along their longitudinal axis.

In the initial assembly or in a maintenance of the container handling device, accordingly no screwing of the pivot shafts to the support or no releasing of the screwed connection between pivot shaft and support is necessary, but rather the pivot shafts can be easily plugged into the support of the container handling device. Consequently, the effort required for assembly and maintenance is reduced in relation to traditional clamping devices.

In addition, through the plug-in of the cylinder pin portions of the pivot shafts, a particularly accurate positioning of the clamping device, and in particular of the clamping arms, is enabled, since the pivot shafts are used directly to position both the clamping device in relation to the support, and the clamping arms in relation to the support plate as well as in relation to the support.

It has proved advantageous if the cylinder pin portions of the pivot shafts and the bores of the support form a press fit, so that the pivot shafts, due to the press fit and after having been introduced, are held on the support. In certain embodiments, the press fit is in this case a slight interference fit, which is configured such that an introduction of the pivot shafts into the bore is possible without an additional tool, for instance by a H7/m6, H7/n6, H7/p6 pairing or a similar fit.

According to another embodiment, the cylinder pin portions are respectively arranged on a side of the respective pivot shaft that lies opposite the support plate. As a result, when the clamping device is fitted together with the support of the container handling device or the clamping device is attached to the support, the clamping arms are placed between the support plate of the clamping device and the support.

Alternatively, the cylinder pin portions can also be arranged, in relation to the support plate, on a side that lies opposite the clamping arms. The pivot shafts hence extend through the support plate and have on the far side of the support plate the cylinder pin portions. On the other side of the support plate, the clamping arms are arranged correspondingly. As a result, the clamping device, by insertion of the cylinder pin portions into the bores of the support, can be easily plugged onto the support.

According to another embodiment, the pivot shafts have a fit portion for forming a form closure, radially to the longitudinal direction of the pivot shaft, with a locating hole in the support plate, wherein the fit portion and the locating hole generally form a press fit, for example by a H7/m6, H7/n6, H7/p6 pairing or a similar fit. It is hereby possible to align the pivot shafts, and hence the clamping arms, in relation to the support plate. In particular, if an interference fit or press fit exists between the fit portions and the locating holes, the pivot shafts, by simple plugging of the fit portions into the locating holes, can at the same time be fastened to the support plate without the need to screw the pivot shafts into the support plate.

In some embodiments, the pivot shafts respectively have a middle portion, wherein the middle portion of the pivot shafts about which the respective clamping arm is pivotable by means of a hub bore has a greater diameter than the cylinder pin portion and the fit portion of the respective pivot shaft, wherein typically the pivot shafts respectively have on one side of the middle portion a longitudinal step for butting against the support, and on the other side of the middle portion a further longitudinal step for butting against the support plate. As a result, the pivot shafts can be used to position the support plate relative to the support. Moreover, support plate and support, via the longitudinal steps, can be pressed one against the other, for instance by a tightening of a fastening screw, so that a secure fixing of the clamping device to the support can be obtained.

It has proved advantageous if at least one supporting bolt is arranged on the support plate at a distance from the pivot shafts, wherein the supporting bolt has an end face portion for supporting the pivot shafts, in the longitudinal direction, against the support of the container handling device, and a stop for supporting the pivot shafts, in the longitudinal direction, against the support plate. It can thereby be prevented that, by a fastening of the support plate to the support, for instance by means of a fastening screw, a tilting of the support plate relative to the support is generated, which could otherwise, for instance, bring about a wedging of the clamping arms so that the clamping device could no longer function properly.

According to another embodiment, a fastening screw for fastening the clamping device to the support of the container handling device is provided, wherein the fastening screw typically has on one side a head portion, by means of which the fastening screw is supported against a side of the support plate that lies opposite the clamping arms, and on its other side a threaded portion for engaging in a threaded bore of the support. Through the provision of the fastening screw, a secure fixing of the clamping device to the support can be provided.

It has proved advantageous if the fastening screw is configured such that a predefined number of revolutions is necessary in order to fasten the clamping device to the support, generally two to ten revolutions, for example three to eight revolutions, and generally five revolutions.

A particularly small amount of effort in connection with an assembly or disassembly of the clamping device can be obtained if precisely one fastening screw is provided. This fastening screw serves, as it were, as a quick-release fastener for the assembly of the clamping device.

According to another embodiment, the at least one fastening screw is arranged between the pivot shafts and the at least one supporting bolt. As a result, a clamping force transmitted by the fastening screw to the clamping device is transmitted on both sides of the fastening screw, so that a tilting of the support plate relative to the support can be generated, and/or no wedging of the clamping arms between support plate and support can arise.

According to another embodiment, the clamping arms respectively have a control portion for interacting with a control cam for actively moving the respective holding portion. In other words, the clamping device is configured in the form of an active clamping device.

Alternatively, the clamping device can also be configured as a passive clamping device.

According to another embodiment, the control cam has a shaft portion, by means of which it is guided in the axial direction, in relation to the longitudinal direction of the pivot shafts, in a cam bore of the support plate. Moreover, the control cam has a radial groove, wherein a locking element arranged on the support plate is configured to, for the detention of the control cam in the axial direction in relation to the support plate, engage positively in the radial groove. As a result, a particularly simple assembly and disassembly of the control cam respectively on and from the support plate is enabled. For an assembly, the control cam has merely to be introduced with its shaft portion into the cam bore, and the locking element pushed into the radial groove. Correspondingly, in the case of a disassembly, the locking element has merely to be removed from the radial groove. After this, the control cam can be easily pulled out of the cam bore.

In various embodiments, the locking element is fastened to the support plate by means of a screw such that, by a loosening of the screwed connection, a displacement of the locking element transversely to the axial direction is enabled, wherein generally the support plate has a step by which the locking element, in a locking position in which the locking element is in engagement with the radial groove, is positioned radially to the axial direction, wherein typically a predefined number of revolutions is necessary in order to be able to move the locking element out of the locking position, generally half a revolution to three revolutions, for example one revolution. A disassembly of the locking element from the support plate can thereby be dispensed with. Hence, in an exchange of the control cam which has suffered wear during operation, the screw has merely to be loosened and the locking element moved out of the locking position. No loose parts are herein created. Moreover, the effort required for this is comparatively small, so that the exchange can take place in a comparatively short time.

A particularly simple assembly and disassembly of the control cam, as well as a particularly simple construction of the clamping device, can be obtained if the locking element is fastened to the support plate by means of the fastening screw.

If the predefined number of revolutions for releasing the support plate from the support is herein greater than the predefined number of revolutions for loosening the locking element, the locking element can be moved by a loosening of the fastening screw, out of the locking position, without the need for a full release of the support plate, and thus of the clamping device, from the support.

BRIEF DESCRIPTION OF THE FIGURES

Further embodiments of the invention are are explained in greater detail by the following description of the figures

DETAILED DESCRIPTION

Below, illustrative embodiments are described with reference to the figures. Same, similar or like-acting elements in the different figures are here provided with identical reference symbols and a repeated description of these elements is partially dispensed with in order to avoid redundancies.

Figure 1:
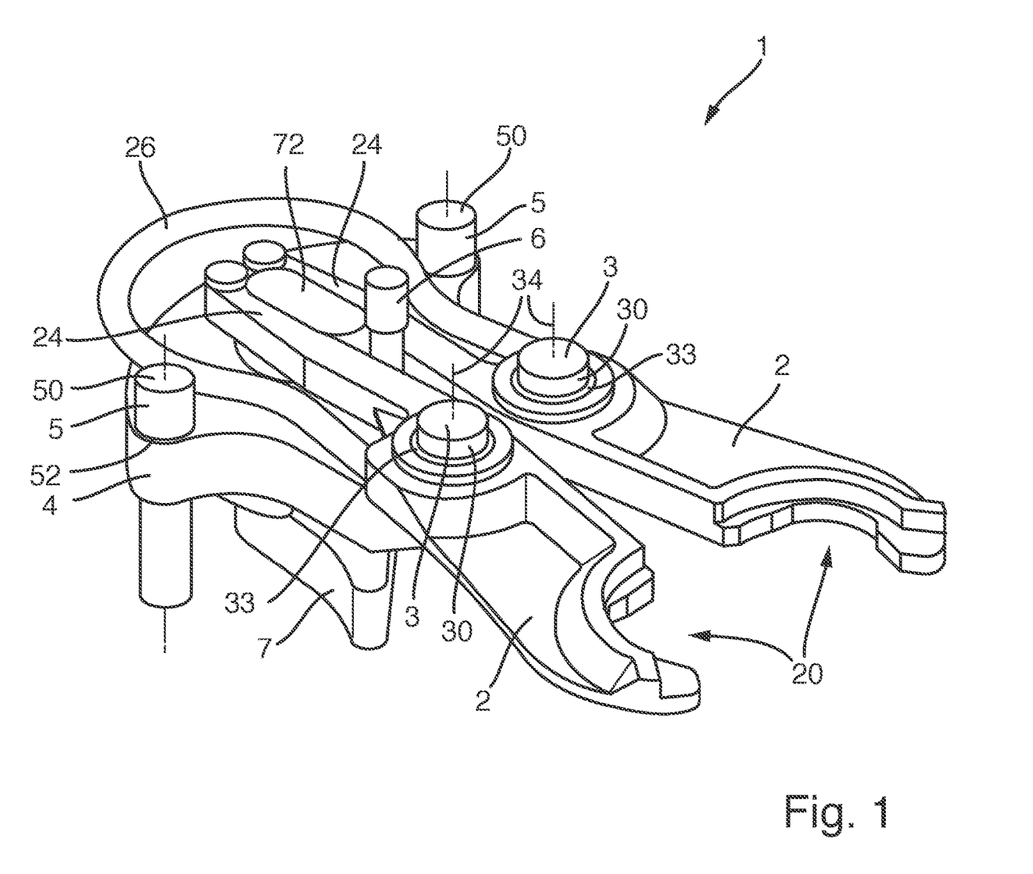
FIG. 1 shows schematically a perspective side view of a clamping device for holding a container.

FIG. 1 shows schematically a perspective side view of a clamping device 1 for holding a container. The clamping device 1 includes a first and a second clamping arm 2, which are respectively arranged on a support plate 4 pivotably about a corresponding first and a second pivot shaft 3. The clamping arms 2 respectively have a holding portion 20 for contact against the container to be held.

The clamping arms 2 further respectively have a control portion 24 for interaction with a control cam 7 for actively moving the respective holding portion 20, wherein the control portions 24 respectively interact with an interaction portion 72, arranged between these same, of the control cam 7. The clamping device 1 is hence an active clamping device.

The clamping device 1 includes a pretensioning element 26, which pretensions the holding portions 20 into an open position. In the present case, the pretensioning element 26 is configured in one piece with the clamping arms 2. Alternatively, the pretensioning element 26 can also be provided as a separate part.

As described in yet further detail below, the first and the second pivot shaft 3 respectively have a cylinder pin portion 30 for forming a form closure, radially to the longitudinal direction 34 of the pivot shafts 3, with a bore (not shown here) of a support (not shown here) of a container handling device.

The cylindrical cylinder pin portions 30 are respectively adjoined in the longitudinal direction 34 at the pivot shafts 3 by a longitudinal stop 33, by means of which the pivot shafts 3 butt against the support of the container handling device, as is explained in greater detail below with regard to FIG. 2.

The clamping device 1 further has optional supporting bolts 5, which are pressed into corresponding bores in the support plate 4. The supporting bolts 5 are arranged on the support plate 4 at a distance from the pivot shafts 3, wherein the supporting bolts 5 have an end face portion 50 for bearing in the longitudinal direction 34 against the support of the container handling device, as well as a stop for bearing in the longitudinal direction 34 against the support plate 4.

Figure 2:
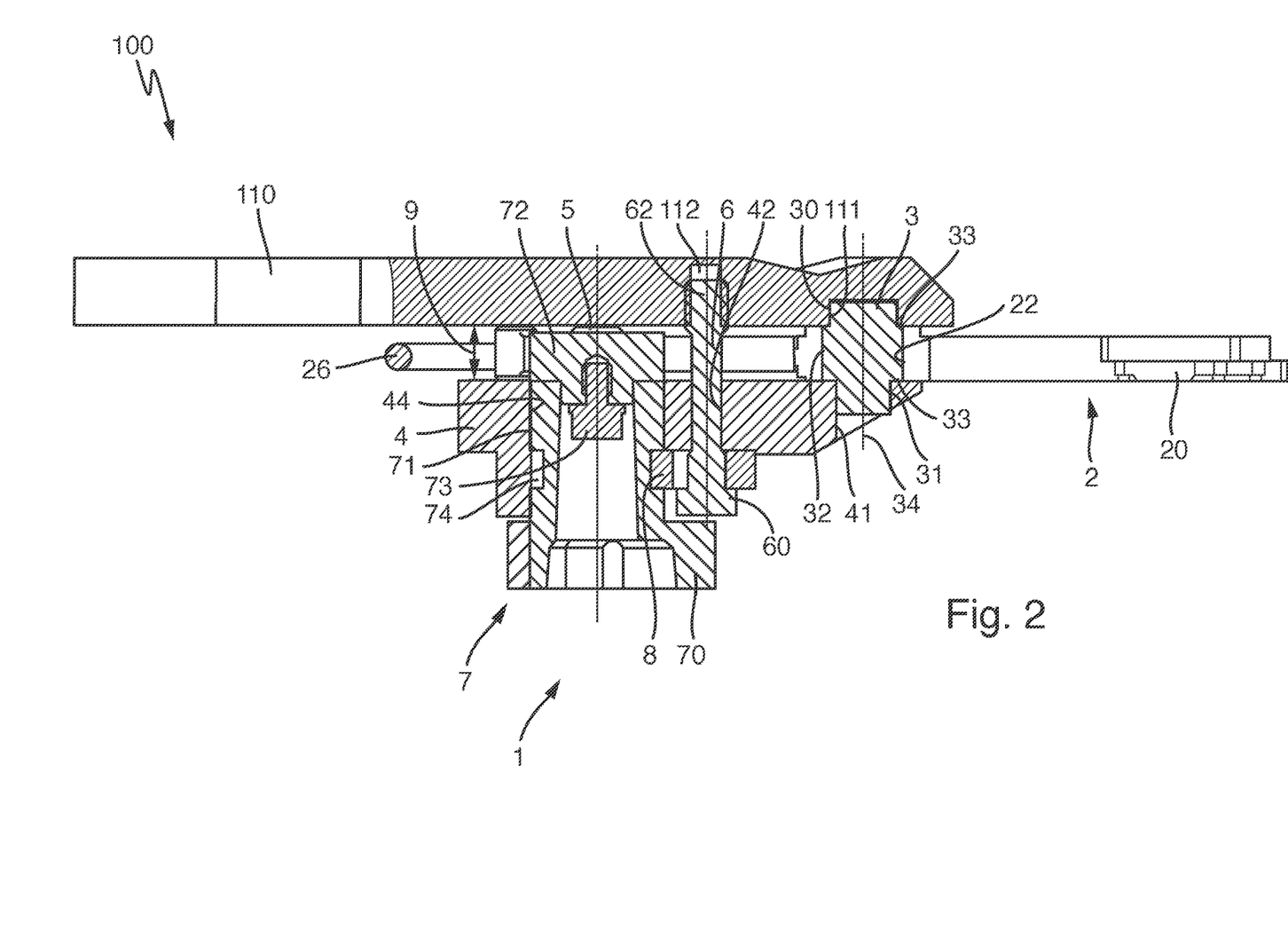
FIG. 2 shows schematically a sectional view through the clamping device from FIG. 1.

In FIG. 2, a sectional view through the clamping device 1 from FIG. 1 is shown schematically. By means of the reference symbol 110 a support of a container handling device 100 is indicated, which support is rotatable about a rotational axis (not shown here).

It can here clearly be seen that the pivot shaft 3 is introduced with its cylinder pin portion 30 into an appropriately configured bore 111 in the support 110, and so the form closure is configured transversely to the longitudinal direction 34. The pivot shaft 3 is introduced, up to its longitudinal stop 33, into the bore 111. Viewed in the longitudinal direction 34, the pivot shaft 3 has, starting from the longitudinal stop 33 that butts at the front against the support 110, a middle portion 32, about which the clamping arms 2 are respectively pivotably mounted with a hub bore 22. The middle portion 32 extends up to a further longitudinal step 33 for butting against the support plate 4. Adjoining this, the pivot shaft 3 has a fit portion 31, which is introduced into a locating hole 41 in the support plate 4.

Because, as is evident from FIG. 2, the diameter of the middle portion 32 is greater than that of the cylinder pin portion 30 and that of the fit portion 31, on both sides of the middle portion 32 the previously described longitudinal steps 33 exist.

In the present case, the fit portion 31 and the locating hole 41 form a press fit, so that the pivot shafts 3 are fastened to the support plate 4.

The cylinder pin portion 30 and the bore 111 form a transition fit or a slight interference fit such that the clamping device 1 is held on the support 110, yet can be removed again from the support 110 without major expenditure of force.

In order to fix the clamping device 1 to the support 110, the fastening screw 6 is screwed by means of a threaded portion 62 into a threaded bore 112 appropriately provided in the support 110. In relation to the support 110, the fastening screw 6 running through a through hole 42 in the support plate 4 is supported against the support plate 4 by means of a head portion 60, wherein a locking element 8, described later in detail, is arranged between the head portion 60 and the support plate 4. The end face 50 and the stop 52 of the supporting bolts 5, as well as the longitudinal stops 33 of the pivot shafts 3, are distanced apart with a predefined spacing 9, viewed in the longitudinal direction 34. As a result, the support plate 4, in the state screwed onto the support 110 by means of the fastening screw 6, is likewise held distanced from the support 110 by the spacing 9.

As can further be gleaned from FIG. 2, the fastening screw 6 is arranged between the pivot shafts 3 and the supporting bolts 5. In other words, in relation to the fastening screw 6, the pivot shafts 3 are arranged on one side and the supporting bolts 5 on the other side. As a result, the tightening force generated by the fastening screw 6 is transmitted on both sides of the fastening screw 6, on the one side by way of the supporting bolts 5 and on the other side by way of the pivot shafts 3, via the support plate 4 to the support 110. In other words, a closed force flow exists on both sides of the fastening screw 6 and through the fastening screw 6.

The fastening screw 6 is configured such that, for the attachment of the clamping device 1 or for the detachment of the clamping device 1, a predefined number of five revolutions is necessary.

Figure 3:
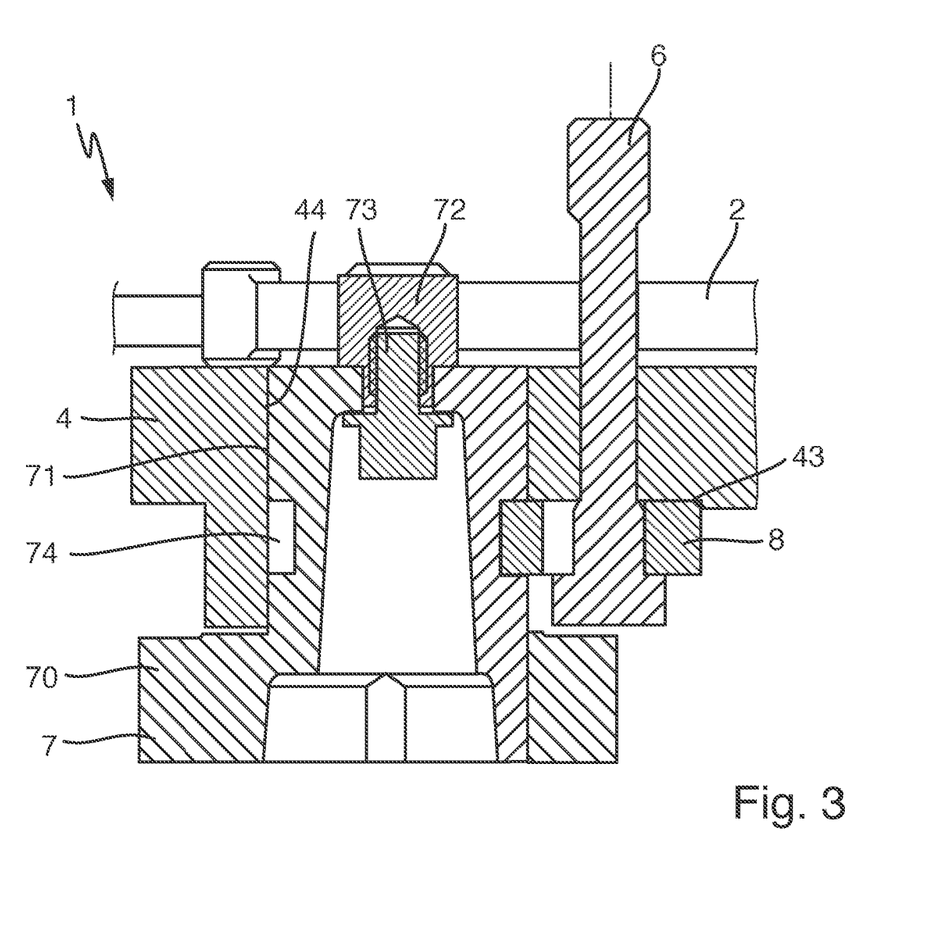
FIG. 3 shows schematically a detailed view from FIG. 2.

FIG. 3 shows schematically a detailed view from FIG. 2, in which the region of the control cam 7 and of the fastening screw 6 is represented in detail, wherein the support 110 is hidden from view.

The control cam 7 has a main body 70, to which the interaction portion 72 is fastened by means of a screw 73. Alternatively, the main body 70 and the interaction portion 72 can also be configured in one piece.

The control cam 7 has a shaft portion 71, by means of which it is guided in the axial direction in relation to the longitudinal direction 34 of the pivot shafts 3 in a cam bore 44 of the support plate 4. The control cam 7 further has a radial groove 74.

The locking element 8 engages in the radial groove 74, so that the control cam 7, in the axial direction, is fixed in relation to the support plate 4. In order to prevent the locking element 8 from, during operation, slipping transversely to the longitudinal direction 34 and thus disengaging from the radial groove 74, the support plate 4 has a step 43, by which the locking element 8 is fixed in a locking position as shown in FIG. 3.

If the fastening screw 6 is turned out of the position fixing the clamping device 1 to the support 110, by one revolution in the releasing direction, and the screwed connection is loosened, then the locking element 8 can be moved out of the locking position by pushing of the locking element 8 over the stop 34.

Figure 4:
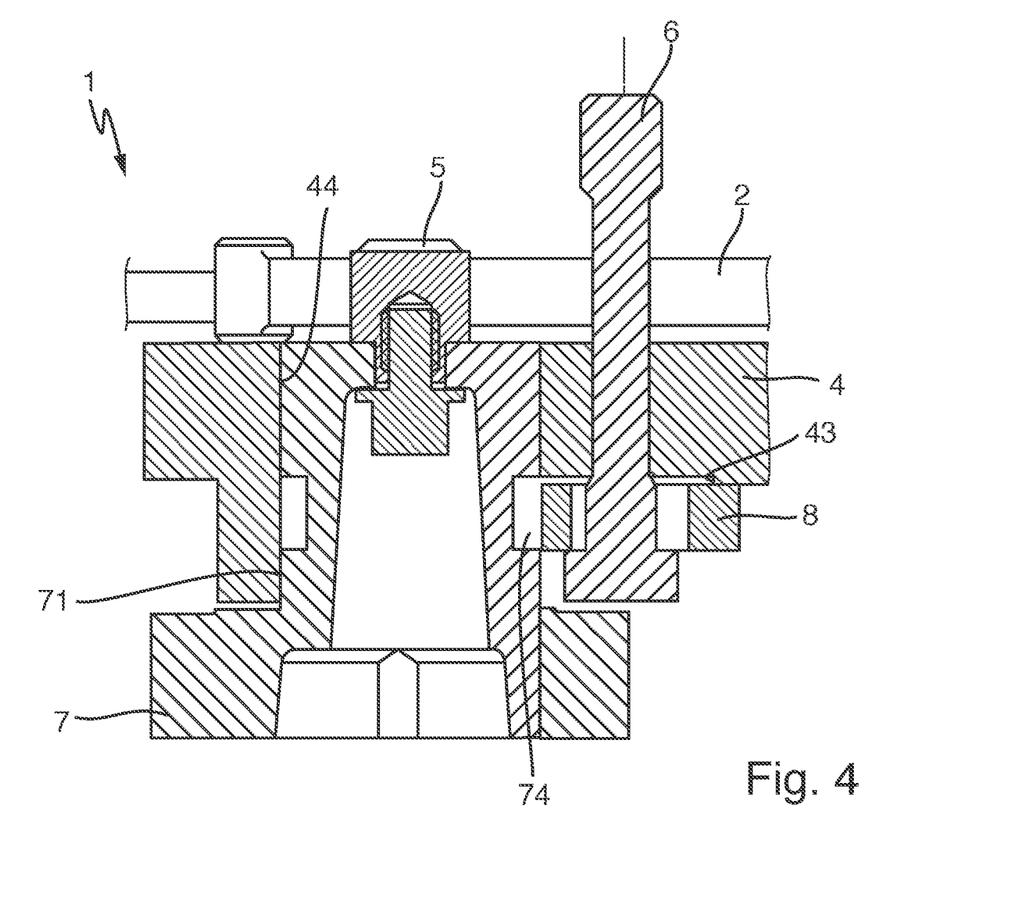
FIG. 4 shows schematically a further detailed view of the clamping device according to FIGS. 1-3.

The prescribed, loosened position of the fastening screw 6, in which the locking element 8 is moved out of the locking position, can be seen from FIG. 4, which shows schematically a further detailed view of the clamping device 1 according to FIGS. 1-3.

Figure 5:
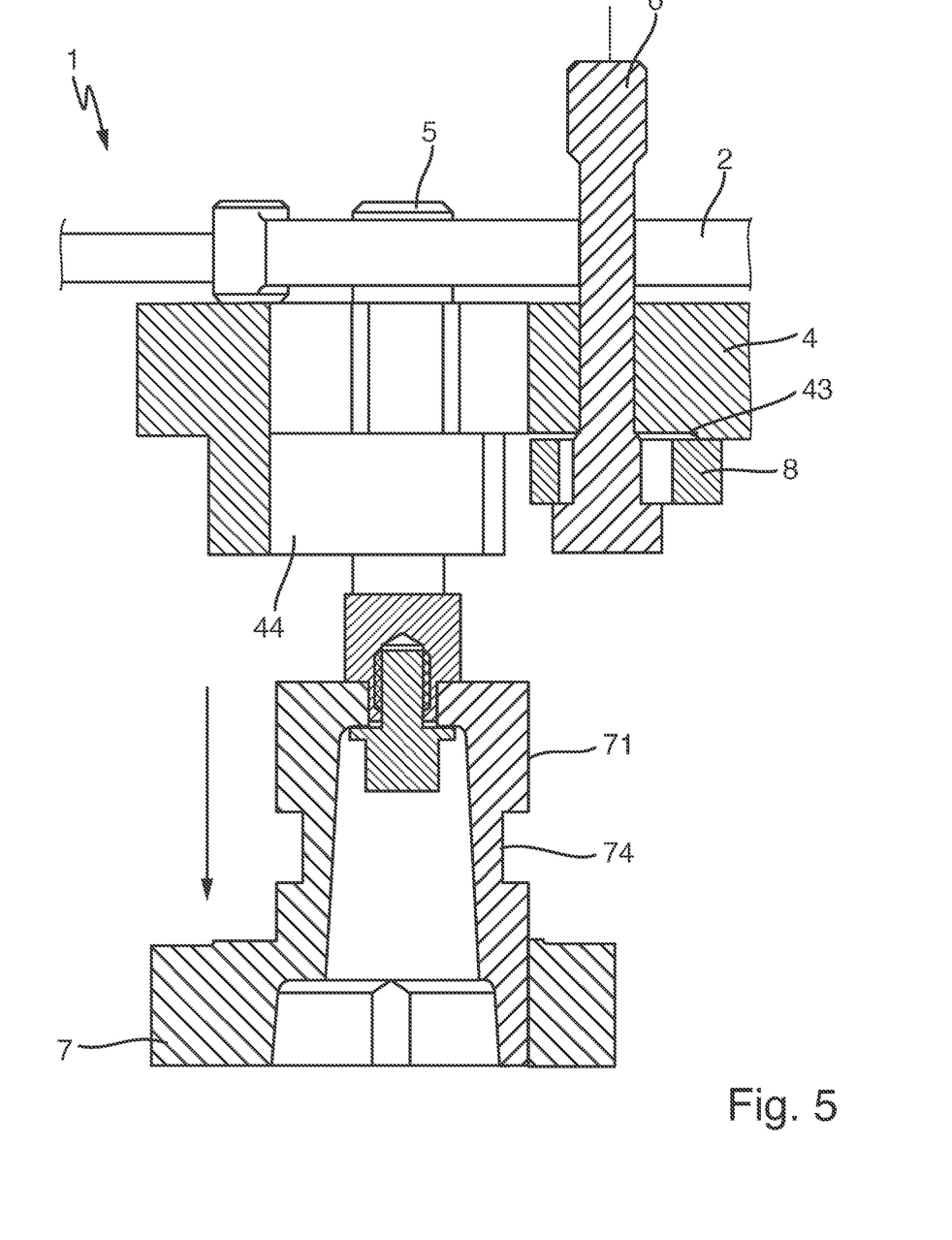
FIG. 5 shows schematically a further detailed view of the clamping device according to FIGS. 1-4.

From FIG. 5 can be seen, in schematic representation, a further detailed view of the clamping device 1 according to FIGS. 1-4, in which the control cam 7 is shown in a state disassembled from the support plate 4.

The main body 70 and the interaction element 72 can have a metal/plastic pairing or a plastic/metal pairing. Alternatively, also both parts 70, 72 can have metal or plastic, wherein the parts 70, 72 are then generally configured in one piece. In addition, the control cam 7 can have at least in part, for example in the region of the interaction portion 72, of the shaft portion 70, and/or in a region of engagement with a switch or a guide of the container handling device 100, a coating, in particular a friction-coefficient-reducing coating, for example of a plastic.

Figure 6:
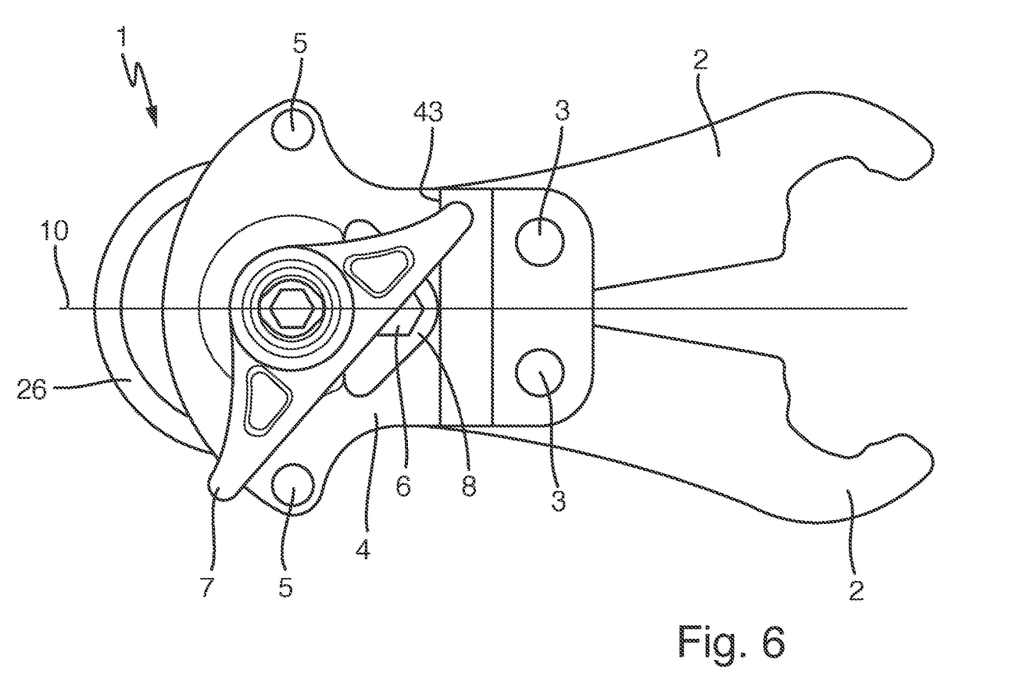
FIG. 6 shows schematically a bottom view of the clamping device from FIG. 1.

FIG. 6 shows schematically a bottom view of the clamping device 1 from FIG. 1, from which, in particular, the design of the stop 43 can be seen.

In addition, FIG. 6 discloses that the clamping device 1 is configured in mirror symmetry in relation to a longitudinal axis 10. The fastening screw 6 and the centre axis of the control cam 7, about which the control cam 7 is held pivotably on the support plate 4, herein lie on the axis of symmetry 10. The pivot shafts 3 and the supporting bolts 5 are respectively arranged on both side of the longitudinal axis 10 and have from the longitudinal axis 10 respectively the same spacing as their respective opposite-situated counterpart. From that which has been described above, a symmetrical loading of the clamping device 1 is obtained.

Where applicable, all individual features which are represented in the illustrative embodiments can be mutually combined and/or exchanged without departing from the scope of the invention.

The invention claimed is:

1. A clamping device for holding a container in a container handling device, comprising:
   a first clamping arm pivotably arranged on a support plate about a first pivot shaft and comprising a first holding portion configured to contact the container;
   a second clamping arm pivotably arranged on the support plate about a second pivot shaft and comprising a second holding portion configured to contact the container; and
   at least one supporting bolt arranged on the support plate at a distance from the first and the second pivot shafts, wherein the first and the second pivot shafts each comprise a respective cylinder pin portion configured to form a first form closure, in a radial direction relative to a longitudinal direction of the first and the second pivot shafts, with a respective bore in a support of the container handling device.

2. The clamping device of claim 1, wherein each cylinder pin portion is respectively arranged on a side of its respective pivot shaft that lies opposite the support plate.

3. The clamping device of claim 1, wherein the first and the second pivot shafts each comprise a respective fit portion configured to form a second form closure, in a radial direction relative to the longitudinal direction of the first and second pivot shafts, with a respective locating hole in the support plate.

4. The clamping device of claim 3, wherein each fit portion and each locating hole form a press fit.

5. The clamping device of claim 3, wherein the first and the second pivot shafts each comprise a respective middle portion having a greater diameter than its respective cylinder pin portion and its respective fit portion.

6. The clamping device of claim 5, wherein the first and the second pivot shafts each comprise on one side of their respective middle portions a first longitudinal step configured to butt against the support of the container handling device and on the other side of their respective middle portions a second longitudinal step to butt against the support plate.

7. The clamping device of claim 1, wherein the at least one supporting bolt comprises:
   an end face portion configured to support the first or the second pivot shaft in the longitudinal direction against the support of the container handling device, and
   a stop configured to support the first or the second pivot shaft in the longitudinal direction against the support plate.

8. The clamping device of claim 1, further comprising a fastening screw configured to fasten the clamping device to the support of the container handling device.

9. The clamping device of claim 8, wherein the fastening screw comprises:
   on one side, a head portion configured to support the fastening screw against a side of the support plate that lies opposite the first and the second clamping arms, and
   on the other side, a threaded portion configured to engage in a threaded bore of the support of the container handling device.

10. The clamping device of claim 8, wherein the fastening screw is configured to fasten the clamping device to the support of the container handling device with a predefined number of revolutions.

11. The clamping device of claim 10, wherein the predefined number of revolutions comprises two to ten revolutions.

12. The clamping device of claim 8, wherein the fastening screw is arranged between the first and the second pivot shafts and at least one supporting bolt.

13. The clamping device of claim 1, wherein the first and the second clamping arms each comprise a respective control portion configured to interact with a control cam configured to move their respective holding portions.

14. The clamping device of claim 13, wherein:
the control cam comprises a radial groove and a shaft portion disposed in a cam bore of the support plate, and
a locking element arranged on the support plate is configured to engage in the radial groove to detain the control cam in an axial direction in relation to the support plate.

15. The clamping device of claim 14, wherein:
the locking element is fastened by a screw to the support plate and loosening the screw displaces the locking element, and
the support plate comprises a step by which the locking element is fixed in a locking position in which the locking element is in engagement with the radial groove.

16. The clamping device of claim 15, further comprising a fastening screw configured to fasten the clamping device to the support of the container handling device with a predefined number of revolutions, and wherein:

the locking element is fastened to the support plate by the fastening screw, and
the predefined number of revolutions is greater than a predefined number of revolutions for loosening the locking element.

17. A clamping device for holding a container in a container handling device, comprising:
a first clamping arm pivotably arranged on a support plate about a first pivot shaft and comprising a first holding portion configured to contact the container;
a second clamping arm pivotably arranged on the support plate about a second pivot shaft and comprising a second holding portion configured to contact the container;
a pretensioning element configured to pretension the first and the second holding portions into an open position; and
at least one supporting bolt arranged on the support plate at a distance between the first and the second pivot shafts,
wherein the first and the second pivot shafts each comprise a respective cylinder pin portion configured to form a form closure, in a radial direction relative to a longitudinal direction of the first and second pivot shafts, with a respective bore in a support of the container handling device.

18. The clamping device of claim 17, further comprising:
a fastening screw configured to fasten the clamping device to the support of the container handling device.

19. The clamping device of claim 18, wherein the fastening screw is arranged between the first and the second pivot shafts and the at least one supporting bolt.

\* \* \* \* \*